United States Patent [19]
Monard

[11] Patent Number: 5,765,471
[45] Date of Patent: Jun. 16, 1998

[54] TORTILLA WARMING DEVICE

[76] Inventor: Ronald E. Monard, 44 Fairlane, Laguna Niguel, Calif. 92677

[21] Appl. No.: 727,711

[22] Filed: Oct. 7, 1996

[51] Int. Cl.⁶ .................................................. A47J 37/00
[52] U.S. Cl. ........................ 99/448; 99/391; 99/393; 219/477; 219/478; 219/386
[58] Field of Search ................. 99/448, 391, 392, 99/393, 399, 424, 374, 483, 450; 219/476, 477, 478, 385, 386

[56] References Cited

U.S. PATENT DOCUMENTS

| | | | |
|---|---|---|---|
| 4,013,869 | 3/1977 | Orts | 219/401 |
| 4,147,924 | 4/1979 | De Witt, Jr. | 219/417 |
| 4,782,745 | 11/1988 | George, Jr. | 99/483 |
| 4,862,792 | 9/1989 | Lerma, Jr. | 99/448 X |
| 5,320,030 | 6/1994 | Hubbard | 99/448 X |
| 5,473,979 | 12/1995 | Ruben | 99/448 X |
| 5,535,664 | 7/1996 | Rokowski | 99/448 X |

*Primary Examiner*—Reginald L. Alexander

[57] ABSTRACT

An apparatus for warming one or a plurality of tortillas or other unleavened breadstuffs individually, on both sides at once, and simultaneously in a traditional manner. The electric kitchen appliance of this device is efficient and easy to use and meets an unmet and growing need. Also disclosed is a method for use.

7 Claims, 2 Drawing Sheets

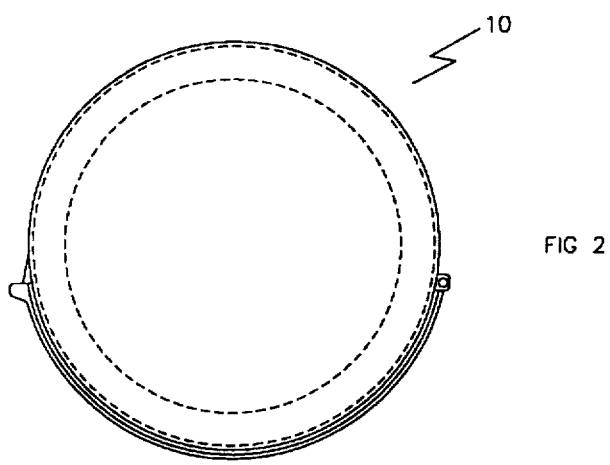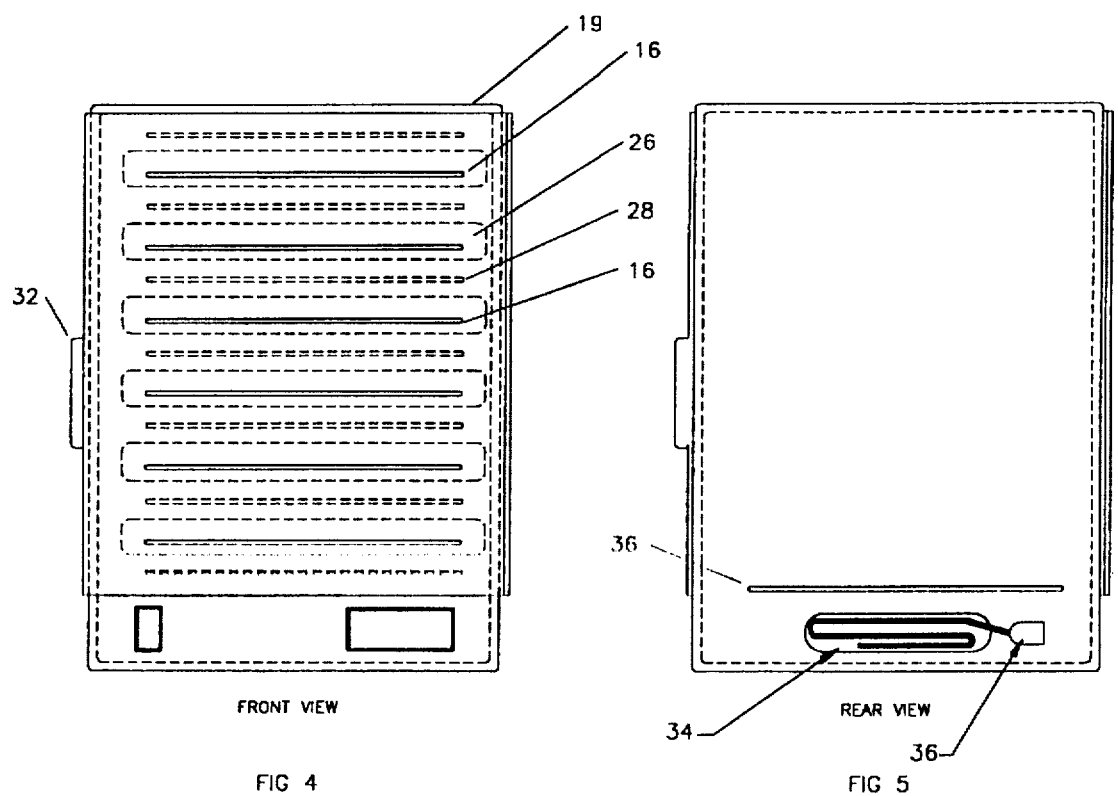

TORTILLA WARMING DEVICE

BACKGROUND OF THE INVENTION

1. Field of the Invention

This invention relates to an apparatus for heating one or several tortillas on both sides simultaneously.

2. Description of the Prior Art

Tortillas, an unleavened breadstuff made from corn meal, ground whole wheat or white flour, were traditionally a ethnic product limited to the typical Hispanic household. Tortillas now, however, have become the fastest growing baked good in America. Since 1980, tortilla sales in the United States have skyrocketed from $300 million to $2.5 billion. In 1995, Americans consumed about sixty billion tortillas. Today, the tortillas market is no longer ethnically limited. Rather, tortillas in America represent approximately one-half of total bread purchases for all consumers.

Even with the tremendous growth in the marketplace of tortilla consumption, American households still lack an efficient method for heating numerous tortillas on both sides simultaneously. For example, the traditional way of heating tortillas in the Latino community is to warm the tortilla, one at a time, by turning it over an open flame, or by placing it on a heated grille, griddle or frying pan and laboriously turning it from one side to the other, one at the time in order to serve a hot tortilla. Frequently, the tortilla becomes burned or charred.

In addition, this process is time consuming and ineffective since a single tortilla can take up to three minutes to warm. It is particularly troublesome when trying to serve a large family or gathering of friends. If several people are eating, the supplying of hot tortillas for the meal is a continuous activity normally resulting in one individual having to constantly heat tortillas for the other individuals eating. The individual preparing and serving the hot tortillas normally has to eat after everyone else and, many times, with cold tortillas. Moreover, the charring creates a mess for the preparer who has to clean up after preparing the tortillas Other modern American families have resorted to microwave ovens for heating one or many tortillas in a stack. This method, also, is not acceptable as the cold tortilla turns into a tough, hardened "Frisbee-like" substance or an unpalatable flaccid disk of softened corn or flour which hardens into an inedible substance as the flaccid disk cools. When the microwave oven is used to heat a stack of tortillas, the outer edges of the stack become hardened while the centers of those in the stack remain cold and unheated.

Some devices have been proposed in the past for heating and/or hydrating cold tortillas such as U.S Pat. Nos. 4,013,869 (Orts), 4,147,924 (DeWitt), and 4,782,745 (George). None of these inventions have met with commercial success and all have the same design flaw - receiving a compressed stack of tortillas and providing a means for heating water to steam the stack of tortillas together. Such steaming results in unacceptable soggy tortillas. In addition, the steam can burn the consumer as all the devices require the person seeking to remove a tortilla to contact the steam chamber in order to remove a tortilla from the stack.

SUMMARY OF THE INVENTION

It is the objective of this invention to provide an apparatus and a method for individually and simultaneously heating both sides of one or a plurality of tortillas.

The apparatus and method of this invention have several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits and advantages.

The first feature of the invention includes a half-cylindrical removable door component. This provides an appliance which can be easily cleaned. The half-cylinder is formed of some lightweight metal alloy or a suitable plastic of the type commonly used in small kitchen appliances. This half-cylinder is pivotally mounted by some type of pivot pins to swing in a vertical plane.

The second feature of the invention includes a number of racks which are either removably or permanently affixed to the interior of the half-cylinder.

The third feature of the invention is an enclosed cylindrical chamber having slits on the front. The enclosed cylinder has a protrusion or a depression or a hinge for receiving the pivot pins of the half-cylinder door. The number of the slits is equal to the number of racks.

The fourth feature of the invention includes a number of horizontally spaced heating elements which would enable the direct exposure of the individually placed tortillas on the racks to be warmed within the enclosed cylinder after the individually separated tortillas are placed on the racks and the half-cylinder is swung into the slits of the closed cylinder. The heating elements are above and below each rack to heat both sides of the tortilla simultaneously. The invention allows the direct exposure of both sides of the tortilla simultaneously to the heating elements.

The fifth feature of the invention may include a locking device so the user cannot be burned by the heating elements.

The sixth feature of the invention may include a timing device to automatically turn off the device at from 1 to 90 seconds.

The seventh feature of the invention may include a temperature device to automatically turn-off the device when a specified temperature is reached.

The eighth feature allows the tortillas to be removed without the risk of a steam burn to the user.

The ninth feature of the invention allows numerous tortillas to be simultaneously and efficiently heated by direct heat in the traditional manner in a matter of seconds while maintaining the desired texture and appearance without charring, burning or a creating a mess.

This invention also includes a method of warming one or a plurality of tortillas with the appropriate steps enumerated within the claims.

BRIEF DESCRIPTION OF THE DRAWING

The preferred embodiment of this invention, illustrating all its features, will now be discussed in detail. This embodiment depicts the novel and non-obvious tortilla warming device and method of this invention as shown in the accompanying drawings, which are for illustrative purposes only. These drawings include the following figures (Figs.), with like numerals indicating like parts:

FIG. 2 is a top plan view depicting the apparatus of this invention, showing the apparatus door closed.

FIG. 4 is a front view showing the slits of the closed cylinder having received the racks of the half-cylinder in the closed position.

FIG. 5 is a back view of the apparatus.

DESCRIPTION OF THE PREFERRED EMBODIMENT

Figure 1:
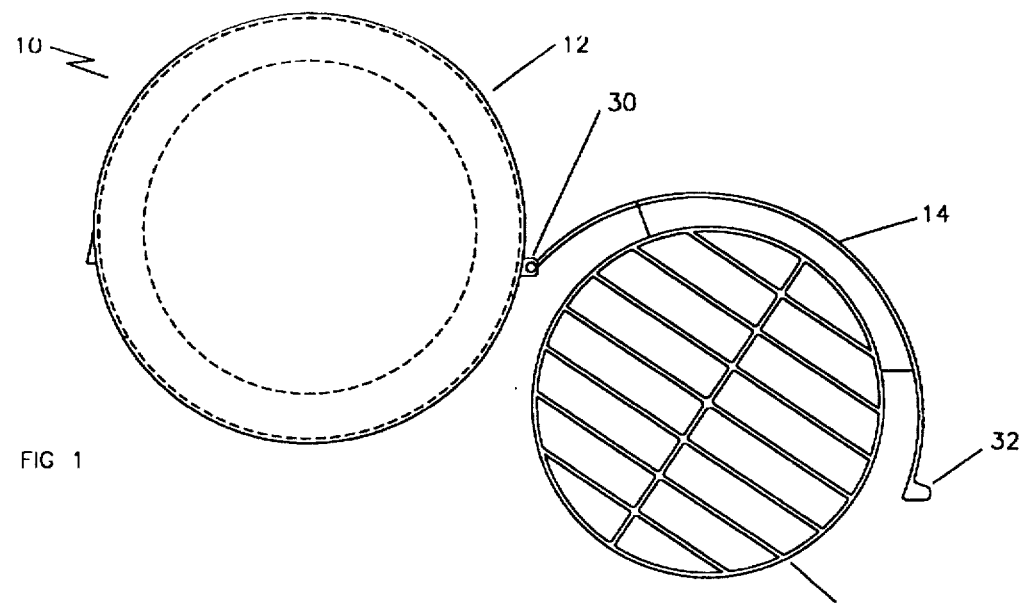
FIG. 1 is a top plan view depicting the apparatus of this invention, showing the apparatus door open.
Figure 3:
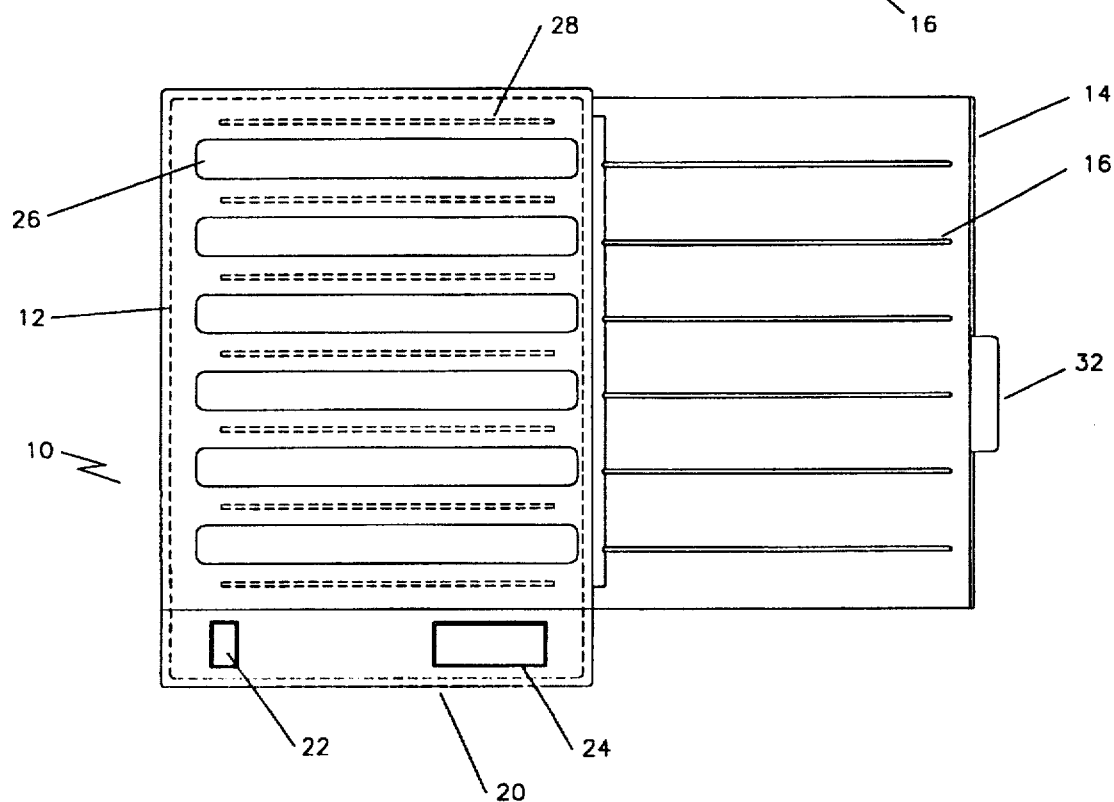
FIG. 3 is a front view showing the slits of the closed cylinder and further showing the open position of the half-cylinder with racks.

Referring to FIGS. 1 and 3, there is shown a tortilla warmer represented generally by referenced numeral 10. The tortilla warmer is an electrical kitchen appliance which is made of a metal alloy or of the typical plastic material for standard kitchen appliances. The warmer 10 has an enclosed cylindrical structure 12, and a half cylindrical structure 14 which is pivotally and removably mounted to the closed cylindrical structure the half-cylindrical structure having a plurality of racks 16. A base 20 may be affixed to or be a part of the closed cylindrical structure and may contain an on/off electrical switch 22. The apparatus may have a locking pin 38 which functions to secure the half-cylinder 14 in the closed position while the switch is in the "on" position. The base 20 may further contain a timer or temperature sensing device 24.

As depicted in FIG. 3, the front of the closed cylinder has a series of small slit-like openings 26. The closed cylindrical structure 12 further has a number of horizontally placed heating elements 28 located on the horizontal plane inside the closed cylindrical container and located above and below the slit like openings.

FIGS. 1 and 3 depict an open, half cylindrical structure 14 which is slightly larger in diameter than the closed cylindrical structure 12. The half-cylindrical structure 14 has pivot pins which provide a hinge-like way to swing the half-cylinder in the vertical plane next to and away from the closed cylindrical structure. The half-cylinder 14 may be removed from the closed cylinder 12 for ease of cleaning. The half-cylindrical structure 12 has a number of racks 16 which are affixed permanently or semi-permanently to the half cylindrical structure 12. The number of racks 16 is equal in number to the slit like openings 26. The half-cylinder 14 may have a handle 32 to simplify opening or shutting.

FIGS. 2 and 4 depict what the tortilla warmer 10 looks like from the top and front, respectively, when the half-cylinder 14 is in the closed position. The racks 16, which are designed to hold one tortilla each, are received into the slit-like openings 26 of the enclosed cylinder 12. The heating elements 28 are located above and below the racks 16 to heat both sides of each of the individual tortillas simultaneously.

The on/off switch 22 and the timer or temperature sensing device 24 may work in concert to pre-determine the number of seconds or the temperature the heating elements radiate.

Finally, FIG. 5, depicts the back view of the tortilla warmer 10. There is an opening 34 for receiving the power cord of the electric plug (not shown). In addition, there may be a crumb tray catcher which may also be removed for cleaning.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims which particularly point out and distinctly claim the subject matter of the invention:

I claim:

1. An apparatus for warming tortillas, including a cylinder which is mounted to a base, said cylinder having a plurality of open slits and having within said cylinder a plurality of horizontally placed electric heating elements, said heating elements located above and below said slits, a half-cylinder door pivotally mounted to said cylinder, a plurality of removable racks spaced within said door, said door having an interior and an exterior surface, said interior surface of said door having a means for receiving and holding said plurality of racks and located to be received through said slits in said cylinder and between said heating elements located within said cylinder.

2. An apparatus as set forth in claim 1 further including an on/off switch electrically connected to said heating elements.

3. An apparatus as set forth in claim 1 further including a timer.

4. An apparatus as set forth in claim 1 wherein said door pivotally swings from an open position to a closed position and having a means to secure said door in the closed position while said heating elements are on.

5. An apparatus as set forth in claim 1 further including a removable tray for catching crumbs.

6. An apparatus as set forth in claim 1 for warming other round unleavened breadstuffs such as pita bread or mu shu.

7. An apparatus as set forth in claim 1 further including a temperature sensing device.

* * * * *